Sept. 12, 1961        KAZUO MOMOI        2,999,413
PROCESS OF MAKING A FISHING NET
Filed Feb. 26, 1959
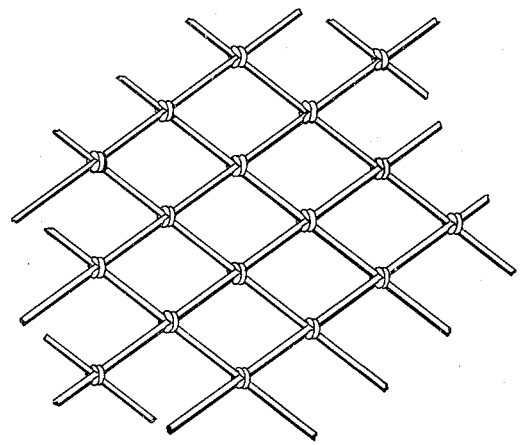
Fig. 1
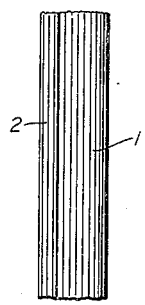
Fig. 2
Fig. 3
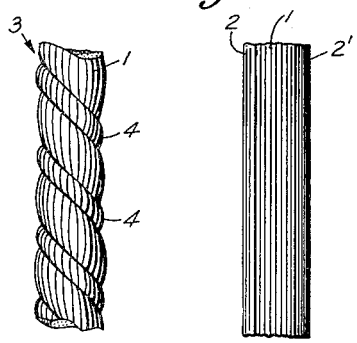
Fig. 4    Fig. 5
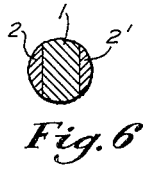
Fig. 6
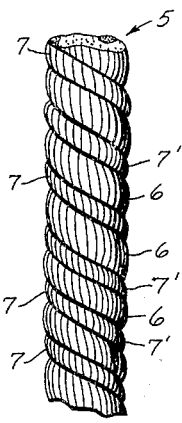
Fig. 7
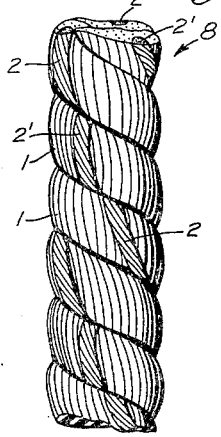
Fig. 8
Fig. 9
INVENTOR.
KAZUO MOMOI
BY George B. Aujero
ATTORNEY : 2,999,413
Patented Sept. 12, 1961

2,999,413
PROCESS OF MAKING A FISHING NET
Kazuo Momoi, 760 Nakahiro, Ako City,
Hyogo-ken, Japan
Filed Feb. 26, 1959, Ser. No. 795,856
2 Claims. (Cl. 87—12)

This invention relates to the fishing-nets and more particularly to structure of a cord for the fishing-net.

The fishing-net made of a polyamide synthetic fiber such as nylon, Amilan, etc., has now been widely used because of its strength, anti-corrosiveness, fast-draining, etc. However, it has some disadvantages like the following: low flexibility and pliability and low plasticity increase rate for heating and also small coefficient of friction. Not only does it need indispensably heat-treatment after netting, but also knots are already loosened before it is heat-treated so that it is very hard to do this operation. Even if the knots are in a good condition and heat-treatment can be performed satisfactorily, it is still difficult to remove the above-mentioned deficiency, that is loosening of the knots. Therefore, a simple repairing of the fishing-net needs necessarily to be done by the hand of experts and is not easily done by fishermen themselves. A fishing-net has now been discovered eliminating the above-mentioned deficiency.

An object of the invention is to provide a fishing-net consisting of a polyamide synthetic fiber arranged together with a selected polyvinyl synthetic fiber so that the weak points of both fibers can be compensated and their effects multiplied in order to obtain a net having a suitable flexibility for operation.

Another object of the invention is to provide a fishing-net wherein the polyvinyl synethtic fiber is so arranged that it is exposed to the outside of the polyamide synthetic fiber in order that the knots may not be loosened. This is accomplished without heat-treatment.

Other objects and advantages of the invention will appear from the following description of the invention.

For the purpose of illustrating the invention, there are shown in the accompanying drawings a form thereof which is at present preferred, although it will be understood that the instrumentalities of which the invention consists may be variously arranged and organized and that the invention is not limited to the specific arrangement and organization of the instrumentalities as herein shown and described.

In the drawings:

FIG. 1 is an elevation of the fishing-net according to this invention.

FIG. 2 an elevation of the unit fibers.

FIG. 3 a diagrammatical and sectional view of the unit fibers of FIG. 2.

FIG. 4 an elevation of the yarn side-twisted with the same unit fibers.

FIG. 5 an elevation of the unit fibers of an application different from the one shown in FIG. 2.

FIG. 6 a diagrammatical and sectional view of the unit fibers of FIG. 5.

FIG. 7 an elevation of the yarn twisted with the same unit fibers as FIG. 5.

FIG. 8 an elevation of a cord made of three twisted yarns.

FIG. 9 a diagrammatical and sectional view of the above.

Referring to the drawings for more specific details of the invention, a unit fiber 1 of polyamide synthetic fiber and appropriate number of the unit fibers 2 of polyvinyl synthetic fiber are arranged in parallel with each other as shown in FIGS. 2 and 3. These are side-twisted as shown in FIG. 4 to form the yarn 3, the core of which consists of a twisted unit fiber 1 of polyamide synthetic fiber, the unit fiber 2 of polyvinyl synthetic fiber being twisted with a spiral band of the unit fiber exposed to the outside. In the application mode shown in FIGS. 5 and 6, appropriate number of the unit fibers 2 and 2' of polyvinyl synthetic fiber are arranged in parallel with each other on both sides of the unit fiber 1 of polyamide synthetic fiber as if to pinch said fiber 1 between them. In the yarn 5 shown in FIG. 7, the unit fibers are side-twisted with the unit fiber 1 which has a smaller surface 6 exposed to the outside than the yarn 3 shown in FIG. 4. The unit fibers 2 and 2' of polyvinyl synthetic fiber are side-twisted to form the spiral bands 7 and 7' of unit fibers which are exposed alternately to the outside.

Several numbers of the yarns 3 and 5 thus made are twisted together to form finally a cord 8 having a polyamide fiber as a core, part of which is completely surrounded by polyvinyl synthetic fiber exposed to the outside as shown in FIGS. 8 and 9 (these figures show the use of three yarns). According to this invention, if the whole outside surface of the polyamide synthetic fiber is surrounded by a polyvinyl synthetic fiber instead of a part as mentioned above, a better result could be obtained. However, in this case, the number of polyamide synthetic fibers would necessarily be diminished and the strength of the cord weakened. Hence, appropriate number of polyvinyl synthetic fibers to be arranged should be fixed in consideration of this strength reduction limit. The cord surrounded with polyvinyl synthetic fiber on the whole outside surface of polyamide synthetic fiber is formed by the following means. First the unit fibers are arranged in parallel as described in FIGS. 4 and 7, then, side-twisted together, or any other means may be taken to expose them to the outside. The following are commercial names of the polyamide synthetic fibers tried for this invention: nylon (U.S.), Perlon T (Germany)—hexamethylenediamine, adipamide, Perlon L (Germany), Amilan (Japan)—polylactoamides, etc. As polyvinyl synthetic fibers, we have PC fiber (Germany)—after chlorinated material of polyvinyl chloride, Vinyon (U.S.), Teviron (Japan)—copolymer of vinyl chloride and vinyl acetate, Vinylon (Japan), Mewlon—polyvinyl alcohol, Saran (U.S.)—polyvinylidene chloride, Sinsen (Japan)—polyacrylonitrile, Velon (U.S.)—copolymer of vinylidene chloride and vinyl chloride, Vinyon N (U.S.)—copolymer of acrylonitrile, Orlon (U.S.)—polyacrylonitrile, etc. The cord 8 thus obtained is made into a fishing-net provided with knots as shown in FIG. 1.

The cord of this invention is twisted of polyamide synthetic fiber added with several numbers of polyvinyl synthetic fibers so that the polyvinyl comes to be exposed to the outside. Deficiency of the former fiber is the following: strength lowering in the water though it is anticorrosive. However, low efficiency in flexibility and pliability of polyamide synthetic fiber is remedied by this addition of polyvinyl synthetic fiber while the strength of polyamide synthetic fiber is preserved, so that the cord can be netted without heat-treatment and knots thus made do not loosen altogether. Owing to this appropriate flexibility endowed to the cord, any external force which tends to loosen the knots will not affect this net while it is in use because all external force will be exhausted by the flexion of the net itself. Moreover, when heat-treatment is given to the knots, as they are not loosened in the fore-process, they are very easily operated and the result is also satisfactory. Furthermore, the polyvinyl synthetic fibers which have a high plasticity increase rate for heating are exposed to the outside, and this is another reason why the knots are very strong and do not loosen before they are heat-treated. Therefore, the net of this invention need not be necessarily heat-treated, and repairing can be done easily as in the case of cotton nets, without special treatment. Besides, polyvinyl synthetic fiber has a greater coefficient of friction than polyamide synthetic fiber. This characteristic contributes much to the loosening-free effect of the knots. Experiments show that a net of Amilan (a polyamide synthetic fiber) has 0.492 coefficient of friction in a fresh water and that of Mewlon (a polyvinyl synthetic fiber) has 0.668 in the same condition while that of Teviron has 0.563. In this invention, as Mewlon, Teviron, etc. are arranged to be exposed to the outside, the knots are maintained by the friction surfaces of these fibers. Hence, there is no occurrence of knots slipping. Moreover, as the cord is twisted together with polyvinyl synthetic fibers, the specific gravity of the net is almost as same as that of a cotton net. It is better casted than a light net of polyamide synthetic fiber only and less subject to be carried by the tidal current. As for price, a net of polyvinyl fiber is much cheaper than the other nets, so it can be said that this invention enables one to provide a cheap net.

The present invention may be embodied in other specific forms without departing from the spirit thereof. It is therefore to be desired that the present embodiments be considered in all respects as illustrative and not restrictive, reference being had to the appended claims rather than to the foregoing description to indicate the scope of the invention.

What is claimed is:

1. The process of making a fishing net, comprising the combination of steps of placing at least one outer strand of polyvinyl synthetic fiber next to one core strand of polyamide synthetic fiber; twisting the outer strand about the inner core to form a composite yarn with the polyamide fiber on the inside and the polyvinyl fiber on the outside; twisting a plurality of said yarns into a cord; knotting a plurality of said cords at spaced intervals with a slipless knot to make a net, whereby, by thus disposing the polyvinyl synthetic fiber strands about the polyamide synthetic fiber strands, said cords can be made into a net without heat treatment and the knots thus made do not loosen.

2. The process claimed in claim 1, wherein two outer strands of polyvinyl synthetic fibers are used, one being placed on each side of the polyamide synthetic fiber core.

References Cited in the file of this patent

UNITED STATES PATENTS

| | | |
|---|---|---|
| 2,088,822 | Saladino | Aug. 3, 1937 |
| 2,161,766 | Rugeley et al. | June 6, 1939 |
| 2,536,312 | Saether | Jan. 2, 1951 |
| 2,590,586 | Thompson | Mar. 25, 1952 |
| 2,591,628 | Snyder | Apr. 1, 1952 |
| 2,682,283 | Lilley | June 29, 1954 |
| 2,792,617 | Haller | May 21, 1957 |

FOREIGN PATENTS

| | | |
|---|---|---|
| 606,107 | Great Britain | Aug. 6, 1948 |
| 1,146,266 | France | May 20, 1957 |